2,992,198
PROCESS OF PRODUCING LIQUID COLOR
Takaji Funahashi, 65 Uwabata-cho, Nishi-ku, Nagoya, Japan
No Drawing. Filed Dec. 5, 1957, Ser. No. 700,770
Claims priority, application Japan Dec. 24, 1956
2 Claims. (Cl. 260—23)

This invention relates to a process of making liquid colors adapted to be used in the liquefied state to give an effect as if painted by crayon or pastel.

The generally known conventional oil colors are made mainly of pigment with a siccative oil as a vehicle, and contain dissolved copal, dammar gum, oil soluble phenolic resin, glyptal, cumarone resin etc., added to give viscosity, spreadability, luster, adhesiveness and hardness, and with additional desiccant, all of these components being kneaded together. Water colors are made mainly of pigment, water as vehicle, and gum arabic, tragacanth gum, dextrin, saccharide, glycerol etc., all of the components being kneaded together. All of these products are paste-like and are supplied in tubes, and in practice the oil colors are diluted by turpentine or mineral spirits, and in the case of water colors, by water.

The object of the present invention is to provide a process of making liquid colors which are different from conventional pasty oil colors or water colors, and which can be used simply in their liquefied state, or if necessary, after being diluted by water and which also will give the drawings painted with them the appearance and qualities of having been painted by crayon or pastel.

As will be clear from the following description, the colors obtained by the present invention are not liquid colors wherein the pigments exist but are emulsified liquids into which dyestuff is dissolved, and therefore in addition to use with a brush they can be painted by means of a tube similar to a fountain pen, having a felt point, the liquid issuing thru the point.

When applied on paper, the liquid color will firmly adhere by co-action of both the penetrating action of the capillary active agent and the agglutinate and the coherent action of water-soluble starch and polyalcohol, and at the same time the oil molecules diffused into the water, forming a coating on the upper surface, will be colored together, and the painted effect in consequence, with the effect of refraction and reflection of external lights, will be as thick and heavy as if applied by crayon or pastel and moreover there will be no fear of smearing the color.

In addition, the liquid color is characterized by the fact that a mixture of two colors can be obtained by first applying one color and then another afterward, and also by the fact that it can be diluted by water if desired since it is an emulsion of the oil-in-water type.

The process of the invention is characterized by the fact that the oil with a proper quantity of water-soluble starch and polyalcohol is first emulsified into an oil-in-water type emulsion by means of capillary active agent and then a proper quantity of dyestuff is added thereto.

Emulsifiable oils such as olive oil and other vegetable oils, lanolin and other animal oils are usable in the present invention, and thereto are added capillary active agents such as polyethylene glycol lauryl ether, and monostearate, polyoxy-ethylene, sorbitol monostearate polyethylene glycol, and mono-oleate and nonionic capillary active agents such as high-grade alcohol sulfate and other known anionic capillary active agents and water. There is further added a proper quantity of vinyl acetate resin and other known water-emulsifiable synthetic resins, starch or tragacanth gum, gum arabic and other water-soluble colloids and polyalcohol such as glycerin, or ethylene glycol and propylene glycol, sorbitol etc., and when all of them are agitated at normal temperature or with applied heat, the oil will be diffused into the water where soluble starch and polyalcohol are dissolved, and the oil will be completely emulsified into an oil-in-water type emulsion. Moreover, this emulsion may be retained in the emulsified state for a considerable length of time on account of the presence of a nonionic capillary active agent or anionic capillary active agent and the protective colloid action of water-soluble starch, and then, when a proper quantity of dyestuff is added into the emulsion, it will be easily dissolved in the emulsified water of the oil-in-water type emulsion, unlike the case of pigment, and become a distinguishable dyestuff.

By adding polyethylene glycol lauryl ether 5 (ratio by weight) to olive oil 5, agitating them at normal temperature or at elevated temperature, and further adding water 10, agitating again and mixing vinyl acetate resin 3 and glycerin 10 in addition, and heating the emulsified liquid of the oil-in-water type thus made to about 80° C. and adding dyestuff 3.5 and agitating thoroughly.

What I claim is:

1. A process of producing a liquid color composition which comprises forming an oil-in-water type emulsion by emulsifying about 5 parts by weight of an oil selected from the group consisting of vegetable oils and animal oils in about 10 parts by weight of an aqueous medium in the presence of about 10 parts by weight of a polyalcohol and about 5 parts by weight of an organic capillary active agent and adding about 3 parts by weight of an emulsifiable synthetic resin, heating the emulsion to about 80° C., and adding thereto about 3.5 parts by weight of a water-soluble dyestuff.

2. A process of producing a liquid color composition which comprises forming an oil-in-water type emulsion by emulsifying about 5 parts by weight of olive oil in about 10 parts by weight of an aqueous medium in the presence of about 10 parts by weight of glycerine and about 5 parts by weight of an organic capillary active agent and adding about 3 parts by weight of vinyl acetate resin, heating the emulsion to about 80° C., and adding thereto about 3.5 parts by weight of a water-soluble dyestuff.

References Cited in the file of this patent
UNITED STATES PATENTS

| | | |
|---|---|---|
| 2,021,141 | Boyer | Nov. 19, 1935 |
| 2,346,041 | Morgan et al. | Apr. 4, 1944 |
| 2,361,454 | Cassel | Oct. 31, 1944 |
| 2,364,692 | Cassel | Dec. 12, 1944 |
| 2,771,374 | Chambers et al. | Nov. 20, 1956 |

OTHER REFERENCES

Painting and Litho Inks, Wolfe-McNair-Dorland, 1949, pp. 326–329.